(12) United States Patent
Wang et al.

(10) Patent No.: US 10,055,220 B2
(45) Date of Patent: Aug. 21, 2018

(54) METHOD, APPARATUS, AND SYSTEM FOR PROCESSING DESKTOP DATA OF MOBILE TERMINAL

(71) Applicant: TENCENT TECHNOLOGY (SHENZHEN) COMPANY LIMITED, Shenzhen (CN)

(72) Inventors: Yongxin Wang, Shenzhen (CN); Bin Li, Shenzhen (CN); Yu Chen, Shenzhen (CN); Zengxiang Lyu, Shenzhen (CN); Cheng Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 50 days.

(21) Appl. No.: 15/209,283

(22) Filed: Jul. 13, 2016

(65) Prior Publication Data
US 2016/0321066 A1    Nov. 3, 2016

Related U.S. Application Data

(63) Continuation of application No. PCT/CN2015/075012, filed on Mar. 25, 2015.

(30) Foreign Application Priority Data

Mar. 25, 2014  (CN) .......................... 2014 1 0114062

(51) Int. Cl.
*G06F 3/06*   (2006.01)
*G06F 3/0481*  (2013.01)
(Continued)

(52) U.S. Cl.
CPC .............. *G06F 8/70* (2013.01); *G06F 3/0488* (2013.01); *G06F 3/04817* (2013.01);
(Continued)

(58) Field of Classification Search
CPC ............ G06F 8/60–8/68; G06F 9/4856; G06F 3/04817; G06F 3/0488; H04M 1/72583
(Continued)

(56) References Cited

U.S. PATENT DOCUMENTS 8,869,142 B2 * 10/2014 Gouge .................... G06F 21/51
                                                717/169
8,966,375 B2 *  2/2015 Wasko ................. G06F 3/0482
                                                715/740
(Continued)

FOREIGN PATENT DOCUMENTS

| CN | 102624754 A | 8/2012 |
|---|---|---|
| CN | 102819461 A | 12/2012 |
| CN | 103472974 A | 12/2013 |

OTHER PUBLICATIONS

Schuchardt, V., Moving mobile applications between mobile devices seamlessly, Proceedings of the 34th International Conference on Software Engineering, 2012, pp. 1595-1598, [retrieved on May 8, 2018], Retrieved from the Internet: <URL:http://dl.acm.org/>.*

(Continued)

*Primary Examiner* — Geoffrey St Leger
(74) *Attorney, Agent, or Firm* — Anova Law Group, PLLC

(57) ABSTRACT

The desktop data of a first mobile terminal may be acquired. Then, a local folder is created for a terminal application according to a desktop layout file in the desktop data, and an identifier is set. A mapping relationship between identifiers of new and original folders is established. Then, an installation package of the terminal application is traversed to determine whether the terminal application is installed locally. If yes, a local folder to which the terminal application belongs is determined according to the mapping relationship, installation information of the terminal application (Continued)

is placed in the determined local folder, and an icon of the terminal application is displayed at a corresponding location on a local desktop according to location information of the terminal application.

18 Claims, 4 Drawing Sheets

(51) Int. Cl.
    *G06F 3/0488*     (2013.01)
    *G06F 8/61*     (2018.01)
    *G06F 8/70*     (2018.01)
    *G06F 9/48*     (2006.01)
    *H04M 1/725*     (2006.01)
    *G06F 9/44*     (2018.01)

(52) U.S. Cl.
    CPC .............. *G06F 3/0647* (2013.01); *G06F 8/61* (2013.01); *G06F 8/68* (2013.01); *G06F 9/4856* (2013.01); *H04M 1/72583* (2013.01)

(58) Field of Classification Search
    USPC .................................................. 717/168–178
    See application file for complete search history.

(56) References Cited

U.S. PATENT DOCUMENTS

| | | | | |
|---|---|---|---|---|
| 9,471,298 B2* | 10/2016 | Ito | ............................ | G06F 13/00 |
| 9,544,196 B2* | 1/2017 | Hardy | ..................... | H04L 41/22 |
| 2004/0165008 A1* | 8/2004 | Levine | .................... | G06F 9/451 |
| | | | | 715/789 |
| 2005/0220060 A1 | 10/2005 | Takusagawa et al. | | |
| 2007/0234343 A1* | 10/2007 | Gouge | .................... | G06F 21/51 |
| | | | | 717/174 |
| 2011/0061010 A1* | 3/2011 | Wasko | .................. | G06F 3/0482 |
| | | | | 715/769 |
| 2013/0275553 A1* | 10/2013 | Shilo | ......................... | G06F 8/61 |
| | | | | 709/217 |
| 2014/0215366 A1* | 7/2014 | Ryu | ..................... | G06F 11/3438 |
| | | | | 715/765 |
| 2014/0237402 A1* | 8/2014 | Pang | .................. | G06F 3/04817 |
| | | | | 715/765 |
| 2014/0280262 A1* | 9/2014 | Hui | ..................... | G06F 3/04817 |
| | | | | 707/756 |

OTHER PUBLICATIONS

Potter, S., et al., MediaPod: A Personalized Multimedia Desktop in Your Pocket, 11th IEEE International Symposium on Multimedia, 2009, pp. 219-226, [retrieved on May 8, 2018], Retrieved from the Internet: <URL:http://ieeexplore.ieee.org/>.*

The State Intellectual Property Office of the People's Republic of China (SIPO) Office Action 1 for 201410114062.5 dated Aug. 2, 2017 pp. 1-7.

The World Intellectual Property Organization (WIPO) International Search Report for PCT/CN2015/075012 dated Jun. 17, 2015 p. 1-3.

* cited by examiner

METHOD, APPARATUS, AND SYSTEM FOR PROCESSING DESKTOP DATA OF MOBILE TERMINAL

CROSS-REFERENCES TO RELATED APPLICATIONS

This application is a continuation of and claims priority of PCT/CN2015/075012 filed on Mar. 25, 2015, which claims priority of Chinese Patent Application No. 201410114062.5, filed on Mar. 25, 2014. The entire contents of the two applications are incorporated by reference herein.

FIELD OF THE TECHNOLOGY

The present disclosure relates to the field of communications technologies, and in particular, to a method, an apparatus, and a system for processing desktop data of a mobile terminal.

BACKGROUND OF THE DISCLOSURE

With the rapid development of communications technologies, mobile terminals have become an indispensable part of people's daily lives, and how to improve the performance of a mobile terminal is also an issue that the industry is concerned about all the time.

When using a mobile terminal, a user usually places shortcuts of some frequently-used terminal applications and/or corresponding components on a desktop of a mobile terminal according to preferences and demands of the user. The shortcuts of the terminal applications and the components that are placed on the desktop may be collectively referred to as desktop data.

In the existing technology, when a user needs to use a desktop the same as that of a mobile terminal B on a mobile terminal A, the user always needs to reset a desktop of the mobile terminal A to achieve the objective, which is not only time-consuming but also leads to complex operations; as a result, the efficiency is low.

SUMMARY

Embodiments of the present disclosure provide a method, an apparatus, and a system for processing desktop data of a mobile terminal, which can implement migration of desktop data between different mobile terminals, reduce a desktop setting time, simplify an operation, and improve the efficiency.

A method for processing desktop data of a mobile terminal includes: acquiring desktop data of a first mobile terminal, the desktop data including a desktop layout file and an installation package of a terminal application, the desktop layout file including a first identifier and location information of the terminal application on a desktop of the first mobile terminal, and the first identifier being an identifier of a folder, to which the terminal application belongs, in the first mobile terminal; creating a local folder for the terminal application according to the desktop layout file, and setting a second identifier, the second identifier being an identifier of the local folder; establishing a mapping relationship between the first identifier and the second identifier; traversing the installation package of the terminal application to determine whether the terminal application is installed locally; if yes, determining, according to the mapping relationship, a local folder to which the terminal application belongs, acquiring installation information of the terminal application, placing the installation information in the determined local folder, acquiring an icon of the terminal application, and displaying the icon at a corresponding location on a local desktop according to the location information of the terminal application on the desktop of the first mobile terminal; and if not, acquiring the icon of the terminal application from the installation package of the terminal application, adding a Not Installed indication to the acquired icon, and displaying, at a corresponding location on the local desktop according to the location information of the terminal application on the desktop of the first mobile terminal, the icon added with the Not Installed indication.

An apparatus for processing desktop data include an acquisition unit, an establishment unit, a determining unit, a first processing unit, and a second processing unit as follows. The acquisition unit is configured to acquire desktop data of a first mobile terminal, the desktop data including a desktop layout file and an installation package of a terminal application, the desktop layout file including a first identifier and location information of the terminal application on a desktop of the first mobile terminal, and the first identifier being an identifier of a folder, to which the terminal application belongs, in the first mobile terminal. The establishment unit is configured to create a local folder for the terminal application according to the desktop layout file, and set a second identifier, the second identifier being an identifier of the local folder; and establish a mapping relationship between the first identifier and a second identifier. The determining unit is configured to traverse the installation package of the terminal application to determine whether the terminal application is installed locally. The first processing unit is configured to: when the determining unit determines that the terminal application is installed locally, determine, according to the mapping relationship, a local folder to which the terminal application belongs, acquire installation information of the terminal application, place the installation information in the determined local folder, acquire an icon of the terminal application, and display the icon at a corresponding location on a local desktop according to the location information of the terminal application on the desktop of the first mobile terminal. The second processing unit is configured to: when the determining unit determines that the terminal application is not installed locally, acquire the icon of the terminal application from the installation package of the terminal application, add a Not Installed indication to the acquired icon, and display, at a corresponding location on the local desktop according to the location information of the terminal application on the desktop of the first mobile terminal, the icon added with the Not Installed indication.

An operating system of a mobile terminal includes any one of apparatuses for processing desktop data provided by the embodiments of the present disclosure.

According to the embodiments of the present disclosure, desktop data of a first mobile terminal are acquired, where the desktop data include a desktop layout file and installation packages of terminal applications, and the desktop layout file includes identifiers (that is, first identifiers) of folders, to which the terminal applications belong, in the first mobile terminal and location information of the terminal applications on a desktop of the first mobile terminal. Then, local folders are created for these terminal applications according to the desktop layout file, and corresponding identifiers, that is, second identifiers, are set for these local folders; mapping relationships between the first identifiers and the second identifiers are established. Then, the acquired installation packages of the terminal applications are traversed to determine whether these terminal applications are installed locally; if yes, a local folder to which the terminal application belongs is determined according to the mapping relationship, installation information of the terminal application is placed in the determined local folder, an icon of the terminal application is acquired, and the icon is displayed at a corresponding location on a local desktop according to the location information of the terminal application on the desktop of the first mobile terminal; and if not, the icon of the terminal application is acquired from the acquired installation package of the terminal application, a Not Installed indication is added to the acquired icon, and then, the icon added with the Not Installed indication is displayed at a corresponding location on the local desktop according to the location information of the terminal application on the desktop of the first mobile terminal, so as to achieve the objective of migrating desktop data between different mobile terminals, and restore a desktop layout of a desktop data migrating party to the greatest extent, which can not only greatly reduce a desktop setting time, simplify an operation, and improve the efficiency, but also can migrate an installed terminal application in the desktop data migrating party to a mobile terminal to which the data is migrated, and reduce traffic and a time of re-downloading the terminal application.

BRIEF DESCRIPTION OF THE DRAWINGS

To describe the technical solutions in the embodiments of the present disclosure or in the existing technology more clearly, the following briefly introduces the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
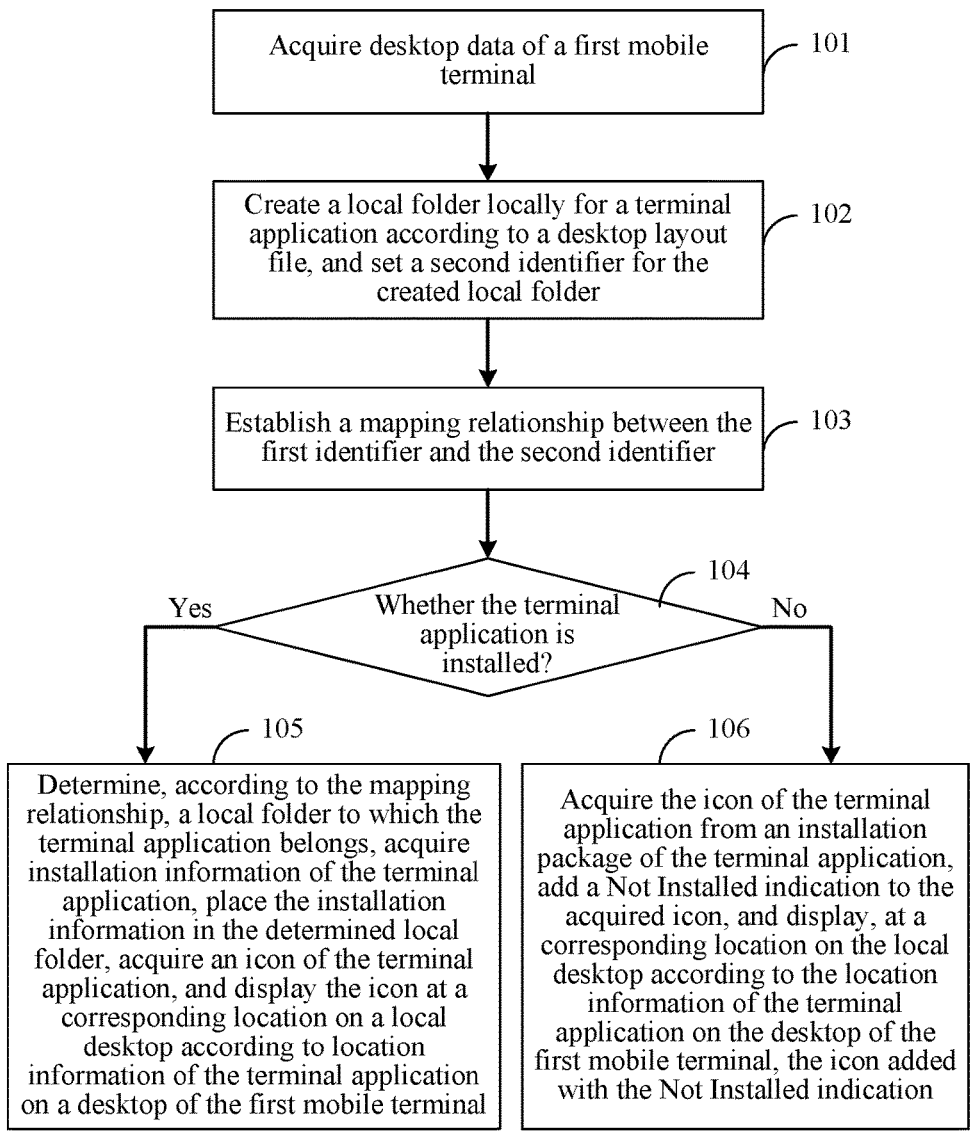
FIG. 1 is a flowchart of a method for processing desktop data of a mobile terminal according to an embodiment of the present disclosure.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a method, an apparatus, and a system for processing desktop data of a mobile terminal, which are separately described in detail below.

Embodiment 1

For the convenience of description, in this embodiment of the present disclosure, a desktop data migrating party is referred to as a first mobile terminal, and a mobile terminal to which the data is migrated is referred to as a second mobile terminal, that is, an example in which desktop data of the first mobile terminal is migrated to the second mobile terminal is used for description. The first mobile terminal and the second mobile terminal may specifically be devices such as mobile phones or tablet computers.

In this embodiment, description is provided from the perspective of the second mobile terminal.

A method for processing desktop data of a mobile terminal includes: acquiring desktop data of a first mobile terminal, where the desktop data include a desktop layout file and installation packages of terminal applications, and the desktop layout file includes identifiers (that is, first identifiers) of folders, to which the terminal applications belong, in the first mobile terminal and location information of the terminal applications on a desktop of the first mobile terminal; creating local folders for these terminal applications according to the desktop layout file, and setting corresponding identifiers, that is, second identifiers, for the local folders; establishing mapping relationships between the first identifiers and the second identifiers; then, traversing the installation packages of these terminal applications to determine whether these terminal applications are installed locally; if yes, determining, according to the mapping relationship, a local folder to which the terminal application belongs, acquiring installation information of the terminal application, placing the installation information in the determined local folder, acquiring an icon of the terminal application, and displaying the icon at a corresponding location on a local desktop according to the location information of the terminal application on the desktop of the first mobile terminal; and if not, acquiring the icon of the terminal application from the installation package of the terminal application, adding a Not Installed indication to the acquired icon, and displaying, at a corresponding location on the local desktop according to the location information of the terminal application on the desktop of the first mobile terminal, the icon added with the Not Installed indication.

As shown in FIG. 1, a specific procedure of the method for processing desktop data of a mobile terminal may be as follows.

101: Acquire desktop data of a first mobile terminal.

The desktop data include data such as a desktop layout file and an installation package of a terminal application, and the desktop layout file may include an identifier of a folder, to which the terminal application belongs, in the first mobile terminal, location information of the terminal application on a desktop of the first mobile terminal, and the like. For the convenience of description, in this embodiment of the present disclosure, the identifier of the folder, to which the terminal application belongs, in the first mobile terminal is referred to as a first identifier.

For example, a first identifier of a folder, to which "browser" belongs, in the first mobile terminal may be set to "1"; a first identifier of a folder, to which "music" belongs, in the first mobile terminal may be set to "2"; a first identifier of a folder, to which "short message service" belongs, in the first mobile terminal may be set to "3"; and a first identifier of a folder, to which "telephone" belongs, in the first mobile terminal may be set to "4".

The desktop data of the first mobile terminal may be acquired in multiple ways. For example, the desktop data sent by the first mobile terminal may be directly received; or, the desktop data of the first mobile terminal may be acquired by a third-party device, and then, the desktop data of the first mobile terminal is acquired from the third-party device. The desktop data may also be transferred between the first mobile terminal and the second mobile terminal in multiple ways. For example, the desktop data may be transferred by using a local area network, Bluetooth, Near Field Communication (NFC), or other communication means; and certainly, the desktop data may also be directly transmitted by using another network, which is not described in detail herein again.

102: Create a corresponding folder locally (that is, in the second mobile terminal) for the terminal application according to the desktop layout file, where the folder is referred to as a local folder in this embodiment of the present disclosure for the convenience of description, and set a corresponding folder identifier for the created local folder, where the identifier is referred to as a second identifier in this embodiment of the present disclosure for the convenience of description.

For example, a second identifier of a local folder to which the "browser" belongs may be set to "4"; a second identifier of a local folder to which the "music" belongs may be set to "5"; a second identifier of a local folder to which the "short message service" belongs may be set to "6"; and a second identifier of a local folder to which the "telephone" belongs may be set to "7".

103: Establish a mapping relationship between the first identifier and the second identifier.

For example, an example in which terminal applications are specifically the browser, music, short message service, and telephone is used. If the first identifier of the folder, to which the "browser" belongs, in the first mobile terminal is "1", the first identifier of the folder, to which the "music" belongs, in the first mobile terminal is "2", the first identifier of the folder, to which the "short message service" belongs, in the first mobile terminal is "3", and the first identifier of the folder, to which the "telephone" belongs, in the first mobile terminal is "4"; and the second identifier of the local folder, to which the "browser" belongs is "4", the second identifier of the local folder, to which the "music" belongs is "5", the second identifier of the local folder, to which the "short message service" belongs is "6", and the second identifier of the local folder, to which the "telephone" belongs is "7", mapping relationships shown in Table 1 may be established, which are specifically as follows:

TABLE 1

| Name of a terminal application | First identifier | Second identifier |
| --- | --- | --- |
| Browser | 1 | 4 |
| Music | 2 | 5 |
| Short message service | 3 | 6 |
| Telephone | 4 | 7 |
| . . . | . . . | . . . |

104: Traverse the acquired installation package of the terminal application to determine whether the terminal application is installed locally (that is, in the second mobile terminal), if yes, perform step 105, and if not, perform step 106.

105: If the terminal application is installed locally, determine, according to the mapping relationship, a local folder to which the terminal application belongs, acquire installation information of the terminal application, place the installation information in the determined local folder, acquire an icon of the terminal application, and display the icon at a corresponding location on a local desktop according to the location information of the terminal application on the desktop of the first mobile terminal.

The step of "determining, according to the mapping relationship, a local folder to which the terminal application belongs" may specifically include: determining the first identifier of the terminal application; searching the mapping relationship according to the first identifier, to determine the second identifier; and determining that a local folder corresponding to the second identifier is the local folder to which the terminal application belongs.

For example, an example in which the terminal application is specifically the "telephone" is used. If the "telephone" is installed locally, the first identifier, for example, "4" of the "telephone" may be first acquired; and then, a mapping relationship between a first identifier and a second identifier is searched according to the first identifier, to determine that a second identifier corresponding to the first identifier "4" is "7"; therefore, it may be determined that the local folder to which the "telephone" belongs is a local folder corresponding to the second identifier "7". In this case, installation information of the "telephone" may be acquired, the installation information is placed in the determined local folder, an icon of the "telephone" is acquired, and the icon of the "telephone" is displayed at a corresponding location on the local desktop according to location information of the "telephone" on the desktop of the first mobile terminal; and by analogy, implementation of another terminal application is similar to this, which is not described in detail herein again.

106: If the terminal is not installed locally, acquire the icon of the terminal application from the installation package of the terminal application, add a Not Installed indication to the acquired icon, and display, at a corresponding location on the local desktop according to the location information of the terminal application on the desktop of the first mobile terminal, the icon added with the Not Installed indication.

For example, the example in which the terminal application is specifically the "telephone" is still used. In this case, the icon of the "telephone" may be acquired from the previously acquired installation package of the terminal application, a Not Installed indication is added to the acquired icon of the "telephone", and then, the icon added with the Not Installed indication is displayed at a corresponding location on the local desktop according to the location information of the "telephone" on the desktop of the first mobile terminal.

Optionally, after the icon added with the Not Installed indication is displayed at the corresponding location on the local desktop, an installation instruction of a user may be further received, for example, an installation instruction that is triggered by the user by clicking the icon is received; and then, the terminal application is installed according to the installation instruction, that is, after the step of "displaying, at a corresponding location on the local desktop according to the location information of the terminal application on the desktop of the first mobile terminal, the icon added with the Not Installed indication", the method for processing desktop data of a mobile terminal may further include: receiving an installation instruction that is triggered by a user by clicking the icon added with the Not Installed indication; acquiring, according to the installation instruction, the installation package of the terminal application corresponding to the icon added with the Not Installed indication; and installing the terminal application according to the acquired installation package of the terminal application.

In addition, after installing the terminal application according to the acquired installation package of the terminal application, the Not Installed indication may be further removed from the icon added with the Not Installed indication, to inform the user that the terminal application is completely installed.

In addition, in addition to acquisition of a terminal application indicated by the desktop layout file, other terminal applications (that is, remaining terminal applications) may further exist locally (that is, in the second mobile terminal). In order to facilitate management, the remaining terminal applications may be placed in one folder, and then, the folder is placed at a preset location on the local desktop, where the location may be set according to a preference of the user or an actual application demand, for example, the folder may be placed after the last icon on the desktop, and the like. That is, the method for processing desktop data of a mobile terminal may further include: placing, in a newly created folder, an icon of a local terminal application except a terminal application indicated by the desktop layout file, and placing an icon of the newly created folder on the local desktop.

It can be known from the foregoing descriptions that, in this embodiment, desktop data of a first mobile terminal are acquired, where the desktop data include a desktop layout file and installation packages of terminal applications, and the desktop layout file includes first identifiers and location information of the terminal applications on a desktop of the first mobile terminal. Then, local folders are created for these terminal applications according to the desktop layout file, and second identifiers are set; mapping relationships between the first identifiers and the second identifiers are established; then, the acquired installation packages of the terminal applications are traversed to determine whether these terminal applications are installed locally; if yes, a local folder to which the terminal application belongs is determined according to the mapping relationship, installation information of the terminal application is placed in the determined local folder, an icon of the terminal application is acquired, and the icon is displayed at a corresponding location on a local desktop according to the location information of the terminal application on the desktop of the first mobile terminal; and if not, the icon of the terminal application is acquired from the acquired installation package of the terminal application, a Not Installed indication is added to the acquired icon, and then, the icon added with the Not Installed indication is displayed at a corresponding location on the local desktop according to the location information of the terminal application on the desktop of the first mobile terminal, so as to achieve the objective of migrating desktop data between different mobile terminals, and restore a desktop layout of a desktop data migrating party to the greatest extent, which can not only greatly reduce a desktop setting time, simplify an operation, and improve the efficiency, but also can migrate an installed terminal application in the desktop data migrating party to a mobile terminal to which the data is migrated, and reduce traffic and a time of re-downloading the terminal application.

It should be noted that, after the desktop data migrating party migrates the desktop data to another mobile terminal, the desktop data migrating party can retain the desktop data, or delete the desktop data; it should be understood that, in this embodiment of the present disclosure, "migration" not only includes a case of migrating the desktop data of the data migrating party to another mobile terminal (that is, the data migrating party does not retain the desktop data) but also may include a case of copying the desktop data of the data migrating party to another mobile terminal (that is, the data migrating party retains the desktop data).

Embodiment 2

According to the method described in Embodiment 1, further description is provided below by using an example.

In this embodiment, an example in which desktop data of a first mobile terminal is migrated to a second mobile terminal is used for description.

Figure 2:
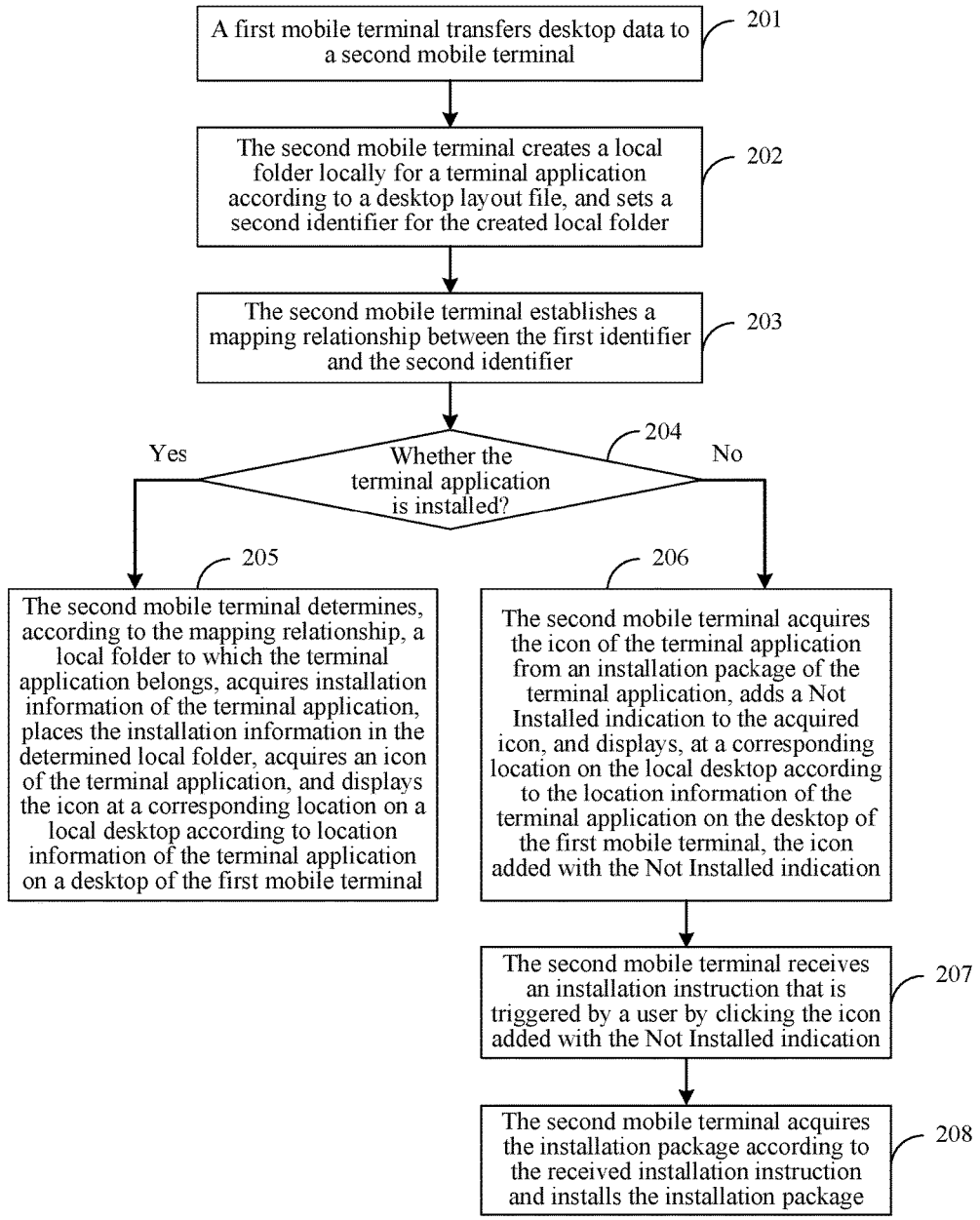
FIG. 2 is another flowchart of a method for processing desktop data of a mobile terminal according to an embodiment of the present disclosure.

As shown in FIG. 2, a specific procedure of a method for processing desktop data of a mobile terminal may be as follows.

201: A first mobile terminal transfers desktop data to a second mobile terminal.

The desktop data include data such as a desktop layout file and an installation package of a terminal application, and the desktop layout file may include an identifier (that is, a first identifier) of a folder, to which the terminal application belongs, in the first mobile terminal, location information of the terminal application on a desktop of the first mobile terminal, and the like.

For example, a first identifier of a folder, to which "browser" belongs, in the first mobile terminal may be set to "1"; a first identifier of a folder, to which "music" belongs, in the first mobile terminal may be set to "2", a first identifier of a folder, to which "short message service" belongs, in the first mobile terminal may be set to "3"; a first identifier of a folder, to which "telephone" belongs, in the first mobile terminal may be set to "4"; and a first identifier of a folder, to which "map" belongs, in the first mobile terminal is "5".

The first mobile terminal may transfer the desktop data to the second mobile terminal in multiple ways. For example, the desktop data may be transferred by using a local area network, Bluetooth, NFC, or other communication; and certainly, the desktop data may also be directly transmitted by using another network, which is not described in detail herein again.

202: The second mobile terminal receives the desktop data transferred by the first mobile terminal, then traverses the received desktop layout file, creates a local folder for a terminal application indicated by the desktop layout file, and sets a corresponding second identifier for the created local folder.

For example, local folders may be created for terminal applications such as the "browser", the "music", the "short message service", the "telephone", and the "map"; and a second identifier of a local folder to which the "browser" belongs is set to "2", a second identifier of a local folder to which the "music" belongs is set to "5", a second identifier of a local folder to which the "short message service" belongs is set to "3", a second identifier of a local folder to which the "telephone" belongs is set to "7", and a second identifier of a folder to which the "map" belongs in the first mobile terminal is set to "1".

It should be noted that, the second identifier may be set according to an actual application demand, and it should be understood that, the above listed manners and values do not impose a limitation.

203: The second mobile terminal establishes a mapping relationship between the first identifier and the second identifier.

For example, an example in which terminal applications are specifically the browser, music, short message service, and telephone is used. If the first identifier of the folder, to which the "browser" belongs, in the first mobile terminal is "1", the first identifier of the folder, to which the "music" belongs, in the first mobile terminal is "2", the first identifier of the folder, to which the "short message service" belongs, in the first mobile terminal is "3", the first identifier of the folder, to which the "telephone" belongs, in the first mobile terminal is "4", and the first identifier of the folder, to which the "map" belongs, in the first mobile terminal is "5"; and the second identifier of the local folder to which "browser" belongs is "2", the second identifier of the local folder to which the "music" belongs is "5", the second identifier of the local folder to which the "short message service" belongs is "3", the second identifier of the local folder to which the "telephone" belongs is "7", and the second identifier of the folder, to which the "map" belongs, in the first mobile terminal is "1", mapping relationships shown in Table 2 may be established, which are as follows:

TABLE 2

| Name of a terminal application | First identifier | Second identifier |
|---|---|---|
| Browser | 1 | 2 |
| Music | 2 | 5 |
| Short message service | 3 | 3 |
| Telephone | 4 | 7 |
| Map | 2 | 1 |
| ... | ... | ... |

204: The second mobile terminal traverses the installation package of the terminal application in the received desktop data to determine whether the terminal application is installed locally (that is, in the second mobile terminal), if yes, perform step 205, and if not, perform step 206.

205: If the terminal application is installed locally, the second mobile terminal determines, according to the mapping relationship, a local folder to which the terminal application belongs, acquires installation information of the terminal application locally (that is, from the second mobile terminal), places the installation information in the determined local folder, acquires an icon of the terminal application, and displays the icon at a corresponding location on a local desktop according to the location information of the terminal application on a desktop of the first mobile terminal.

For example, specifically, the first identifier of the terminal application may be determined, the mapping relationship is searched according to the first identifier, to determine the second identifier; then, it is determined that a local folder corresponding to the second identifier is the local folder to which the terminal application belongs; and then, the installation information of the terminal application is acquired locally (that is, from the second mobile terminal), the installation information is placed in the determined local folder, the icon of the terminal application is acquired, and finally, the icon is displayed at the corresponding location on the local desktop according to the location information of the terminal application on the desktop of the first mobile terminal.

For example, an example in which the terminal application is specifically the "telephone" is used. If the "telephone" is installed locally, the first identifier, for example, "4" of the "telephone" may be first acquired; and then, a mapping relationship between a first identifier and a second identifier is searched according to the first identifier, to determine that a second identifier corresponding to the first identifier "4" is "7"; therefore, it may be determined that the local folder to which the "telephone" belongs is a local folder corresponding to the second identifier "7". In this case, installation information of the "telephone" may be acquired, the installation information is placed in the determined local folder, an icon of the "telephone" is acquired, and the icon of the "telephone" is displayed at a corresponding location on the local desktop (that is, a desktop of the second mobile terminal) according to location information of the "telephone" on the desktop of the first mobile terminal, for example, displayed at an upper left corner of the local desktop; and by analogy, implementation of another terminal application is similar to this, which is not described in detail herein again.

206: If the terminal application is not installed locally, the second mobile terminal acquires the icon of the terminal application from the installation package of the terminal application, adds a Not Installed indication to the acquired icon, so as to inform a user that the terminal application is not installed, so that the user installs the terminal application by clicking the icon subsequently, and then, displays, at a corresponding location on the local desktop according to the location information of the terminal application on the desktop of the first mobile terminal, the icon added with the Not Installed indication.

For example, the example in which the terminal application is specifically the "telephone" is still used. In this case, the icon of the "telephone" may be acquired from the previously acquired installation package of the terminal application, a Not Installed indication is added to the acquired icon of the "telephone", and then, the icon added with the Not Installed indication is displayed at a corresponding location on the local desktop according to the location information of the "telephone" on the desktop of the first mobile terminal.

Optionally, after the icon added with the Not Installed indication is displayed at the corresponding location on the local desktop, an installation instruction of a user may be further received, for example, an installation instruction that is triggered by the user by clicking the icon is received; and then, the terminal application is installed according to the installation instruction, that is, after the step of "displaying, at a corresponding location on the local desktop according to the location information of the terminal application on the desktop of the first mobile terminal, the icon added with the Not Installed indication", the method for processing desktop data of a mobile terminal may further include step 207.

207: The second mobile terminal receives an installation instruction that is triggered by a user by clicking the icon added with the Not Installed indication.

208: The second mobile terminal acquires, according to the received installation instruction, the installation package of the terminal application corresponding to the icon added with the Not Installed indication, and installs the terminal application according to the acquired installation package of the terminal application.

In addition, after the acquired installation package of the terminal application is installed, the Not Installed indication may be further removed from the icon added with the Not Installed indication, to inform the user that the terminal application is completely installed.

In addition, it should be noted that, in addition to acquisition of the terminal application indicated by the desktop layout file, other terminal applications (that is, remaining terminal applications) may exist locally (that is, in the second terminal). In order to facilitate management, the remaining terminal applications may be placed in one folder, and then, the folder is placed at a preset location on the local desktop, where the location may be set according to a preference of the user or an actual application demand, for example, the folder may be placed after the last icon on the desktop, and the like, which is not described in detail herein again.

It can be known from the foregoing descriptions that, in this embodiment, a first mobile terminal transfers desktop data to a second mobile terminal, where the desktop data include a desktop layout file and installation packages of terminal applications, and the desktop layout file may include information such as first identifiers and location information of the terminal applications on a desktop of the first mobile terminal; then, the second mobile terminal creates local folders for these terminal applications according to the desktop layout file, and sets second identifiers; and establishes mapping relationships between the first identifier and the second identifiers; then, the second mobile terminal traverses the acquired installation packages of the terminal applications to determine whether these terminal applications are installed in the second mobile terminal; if yes, the second mobile terminal determines, according to the mapping relationship, a local folder to which the terminal application belongs, places the installation information of the terminal application in the determined local folder, acquires an icon of the terminal application, and displays the icon at a corresponding location on a desktop of the second mobile terminal according to the location information of the terminal application on the desktop of the first mobile terminal; and if not, the second mobile terminal acquires the icon of the terminal application from the acquired installation package of the terminal application, adds a Not Installed indication to the acquired icon, and then, displays, at a corresponding location on the desktop of the second mobile terminal according to the location information of the terminal application on the desktop of the first mobile terminal, the icon added with the Not Installed indication, so as to achieve the objective of migrating the desktop data of the first mobile terminal to the second mobile terminal, and restore a desktop layout of the first mobile terminal in the second mobile terminal to the greatest extent. This solution not only can greatly reduce a desktop setting time, simplify an operation, and improve the efficiency, but also can migrate an installed terminal application in the first mobile terminal to the second mobile terminal, and reduce traffic and a time of re-downloading the terminal application.

Embodiment 3

Figure 3:
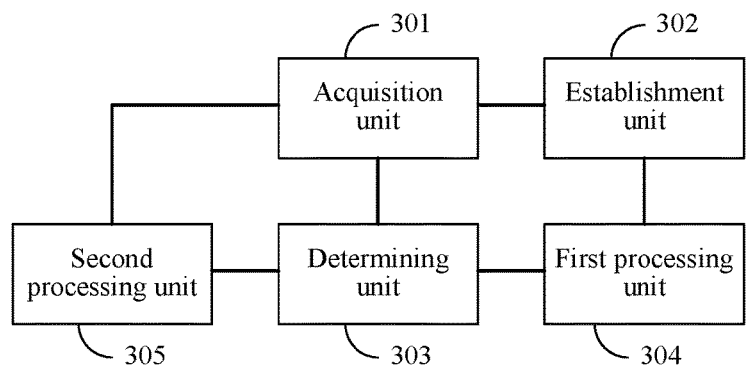
FIG. 3 is a schematic structural diagram of an apparatus for processing desktop data according to an embodiment of the present disclosure.

In order to better implement the foregoing method, this embodiment of the present disclosure further provides an apparatus for processing desktop data. As shown in FIG. 3, the apparatus for processing desktop data may include an acquisition unit 301, an establishment unit 302, a determining unit 303, a first processing unit 304, and a second processing unit 305 as follows:

The acquisition unit 301 is configured to acquire desktop data of a first mobile terminal.

The desktop data include data such as a desktop layout file and an installation package of a terminal application, and the desktop layout file may include an identifier (that is, a first identifier) of a folder, to which the terminal application belongs, in the first mobile terminal, location information of the terminal application on a desktop of the first mobile terminal, and the like.

For example, a first identifier of a folder, to which "browser" belongs, in the first mobile terminal may be set to "1"; a first identifier of a folder, to which "music" belongs, in the first mobile terminal may be set to "2"; a first identifier of a folder, to which "short message service" belongs, in the first mobile terminal may be set to "3"; and a first identifier of a folder, to which "telephone" belongs, in the first mobile terminal may be set to "4".

The desktop data of the first mobile terminal may be acquired in multiple ways. For example, the acquisition unit 301 may directly receive the desktop data sent by the first mobile terminal; or, the desktop data of the first mobile terminal may be acquired by a third-party device, and then, the acquisition unit 301 acquires the desktop data of the first mobile terminal from the third-party device.

The desktop data may also be transferred between the first mobile terminal and the second mobile terminal in multiple ways. For example, the desktop data may be transferred by using a local area network, Bluetooth, NFC, or other communication; and certainly, the desktop data may also be directly transmitted by using another network, which is not described in detail herein again.

The establishment unit 302 is configured to create a local folder for the terminal application according to the desktop layout file acquired by the acquisition unit 301, and set a second identifier (the second identifier is an identifier of the local folder); and establish a mapping relationship between the first identifier and a second identifier.

For example, a second identifier of a local folder to which the "browser" belongs may be set to "4"; a second identifier of a local folder to which the "music" belongs may be set to "5"; a second identifier of a local folder to which the "short message service" belongs may be set to "6"; and a second identifier of a local folder to which the "telephone" belongs may be set to "7".

For details about a method for establishing the mapping relationship between the first identifier and the second identifier, reference may be made to the foregoing method embodiments, which is not described in detail herein again.

The determining unit 303 is configured to traverse the installation package of the terminal application acquired by the acquisition unit 301 to determine whether the terminal application is installed locally.

The first processing unit 304 is configured to: when the determining unit 303 determines that the terminal application is installed locally, determine, according to the mapping relationship established by the establishment unit 302, a local folder to which the terminal application belongs, acquire installation information of the terminal application, place the installation information in the determined local folder, acquire an icon of the terminal application, and display the icon at a corresponding location on a local desktop according to the location information of the terminal application on the desktop of the first mobile terminal.

The second processing unit 305 is configured to: when the determining unit 303 determines that the terminal application is not installed locally, acquire the icon of the terminal application from the installation package of the terminal application, add a Not Installed indication to the acquired icon, and display, at a corresponding location on the local desktop according to the location information of the terminal application on the desktop of the first mobile terminal, the icon added with the Not Installed indication.

The "determining, according to the mapping relationship, a local folder to which the terminal application belongs" may specifically be as follows. Determining the first identifier of the terminal application; searching the mapping relationship according to the first identifier, to determine the second identifier; and determining that a local folder corresponding to the second identifier is the local folder to which the terminal application belongs. That is, the first processing unit 304 may be specifically configured to: when the determining unit 303 determines that the terminal application is installed locally, determine the first identifier of the terminal application; search the mapping relationship according to the first identifier, to determine the second identifier; determine that a local folder corresponding to the second identifier is the local folder to which the terminal application belongs; and acquire the installation information of the terminal application, place the installation information in the determined local folder, acquire the icon of the terminal application, and display the icon at the corresponding location on the local desktop according to the location information of the terminal application on the desktop of the first mobile terminal.

Figure 4:
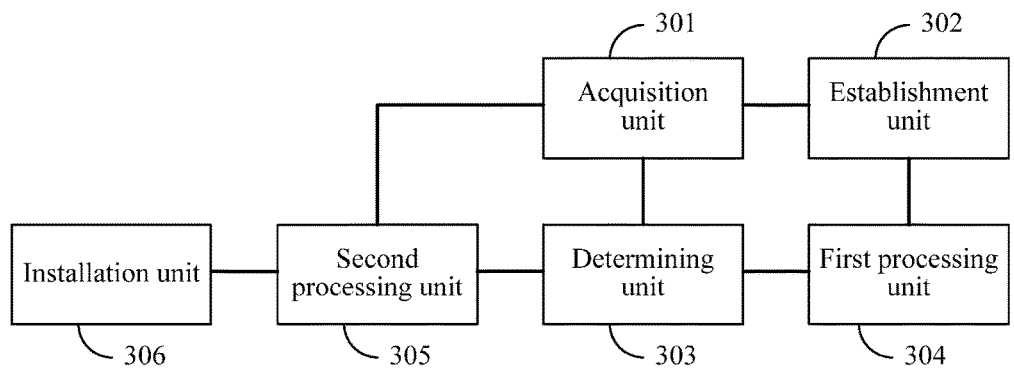
FIG. 4 is another schematic structural diagram of an apparatus for processing desktop data according to an embodiment of the present disclosure.

Optionally, after the icon added with the Not Installed indication is displayed at the corresponding location on the local desktop, an installation instruction of a user may be further received, for example, an installation instruction that is triggered by the user by clicking the icon is received, and then, the terminal application is installed according to the installation instruction, that is, as shown in FIG. 4, the apparatus for processing desktop data may further include an installation unit 306 as follows:

The installation unit 306 is configured to receive an installation instruction that is triggered by a user by clicking the icon added with the Not Installed indication; acquire, according to the installation instruction, the installation package of the terminal application corresponding to the icon added with the Not Installed indication; and install the acquired installation package of the terminal application.

In addition, after the acquired installation package of the terminal application is installed, the Not Installed indication may be further removed from the icon added with the Not Installed indication, to inform the user that the terminal application is completely installed. That is, the second processing unit 305 is further configured to: after the installation unit 306 installs the acquired installation package of the terminal application, remove the Not Installed indication from the icon added with the Not Installed indication.

In addition, in addition to acquisition of a terminal application indicated by the desktop layout file, other terminal applications (that is, remaining terminal applications) may further exist locally (that is, in the second terminal). In order to facilitate management, the remaining terminal applications may be placed in one folder, and then, the folder is placed at a preset location on the local desktop, where the location may be set according to a preference of the user or an actual application demand, for example, the folder may be placed after the last icon on the desktop, and the like. That is, the apparatus for processing desktop data may further include a third processing unit as follows:

The third processing unit is configured to place, in a newly created folder, an icon of a local terminal application except a terminal application indicated by the desktop layout file, and place an icon of the newly created folder on the local desktop.

In specific implementation, the foregoing units may be implemented as separate entities or combined randomly, or implemented as a same entity or several entities. For specific implementation of the foregoing units, reference may be made to the foregoing method embodiments, which is not described in detail herein again.

The apparatus for processing desktop data may be specifically integrated in a mobile terminal, and the mobile terminal may specifically be a device such as a mobile phone or a tablet computer.

It can be known from the foregoing descriptions that, in this embodiment, the acquisition unit 301 of the apparatus for processing desktop data may acquire desktop data of a first mobile terminal, where the desktop data include a desktop layout file and installation packages of terminal applications, and the desktop layout file includes first identifiers and location information of the terminal applications on a desktop of the first mobile terminal; then, the establishment unit 302 creates local folders for these terminal applications according to the desktop layout file, and sets second identifiers; and establishes mapping relationships between the first identifiers and the second identifiers; then, the determining unit 303 traverses the acquired installation packages of the terminal applications to determine whether these terminal applications are installed locally; if yes, the first processing unit 304 determines, according to the mapping relationship, a local folder to which the terminal application belongs, places installation information of the terminal application in the determined local folder, acquires an icon of the terminal application, and displays the icon at a corresponding location on a local desktop according to the location information of the terminal application on the desktop of the first mobile terminal; and if not, the second processing unit 305 acquires the icon of the terminal application from the acquired installation package of the terminal application, adds a Not Installed indication to the acquired icon, and then, displays, at a corresponding location on the local desktop according to the location information of the terminal application on the desktop of the first mobile terminal, the icon added with the Not Installed indication, so as to achieve the objective of migrating desktop data between different mobile terminals, and restore a desktop layout of a desktop data migrating party to the greatest extent, which can not only greatly reduce a desktop setting time, simplify an operation, and improve the efficiency, but also can migrate an installed terminal application in the desktop data migrating party to a mobile terminal to which the data is migrated, and reduce traffic and a time of re-downloading the terminal application.

Embodiment 4

Correspondingly, this embodiment of the present disclosure further provides an operating system of a mobile terminal, including any one of the apparatuses for processing desktop data provided by the embodiments of the present disclosure. For details about the apparatus for processing desktop data, reference may be made to Embodiment 3, which, for example, may be as follows:

The apparatus for processing desktop data is configured to acquire desktop data of a first mobile terminal, where the desktop data include a desktop layout file and installation packages of terminal applications, and the desktop layout file includes identifiers (that is, first identifiers) of folders, to which the terminal applications belong, in the first mobile terminal and location information of the terminal applications on a desktop of the first mobile terminal; create local folders for these terminal applications according to the desktop layout file, and set second identifiers; and establish mapping relationships between the first identifiers and the second identifiers; then, traverse the installation packages of these terminal applications to determine whether these terminal applications are installed locally; if yes, determine, according to the mapping relationship, a local folder to which the terminal application belongs, acquire installation information of the terminal application, place the installation information in the determined local folder, acquire an icon of the terminal application, and display the icon at a corresponding location on a local desktop according to the location information of the terminal application on the desktop of the first mobile terminal; and if not, acquire the icon of the terminal application from the installation package of the terminal application, add a Not Installed indication to the acquired icon, and display, at a corresponding location on the local desktop according to the location information of the terminal application on the desktop of the first mobile terminal, the icon added with the Not Installed indication.

The apparatus for processing desktop data may be further configured to: after displaying, at the corresponding location on the local desktop, the icon added with the Not Installed indication, receive an installation instruction that is triggered by a user by clicking the icon added with the Not Installed indication; acquire, according to the installation instruction, the installation package of the terminal application corresponding to the icon added with the Not Installed indication; and install the acquired installation package of the terminal application.

In addition, after the acquired installation package of the terminal application is installed, the apparatus for processing desktop data may further remove the Not Installed indication from the icon added with the Not Installed indication, to inform the user that the terminal application is completely installed.

In addition, the apparatus for processing desktop data may be further configured to place, in a newly created folder, an icon of a local terminal application except a terminal application indicated by the desktop layout file, and place an icon of the newly created folder on the local desktop.

For details about the foregoing implementation, reference may be made to the foregoing embodiments, which is not described in detail herein again.

The operating system of a mobile terminal includes any one of the apparatuses for processing desktop data provided by the embodiments of the present disclosure, and therefore can also implement beneficial effects that can be implemented by any one of the apparatuses for processing desktop data provided by the embodiments of the present disclosure, and for details, reference may be made to the foregoing embodiments, which are not described in detail herein again.

Embodiment 5

Figure 5:
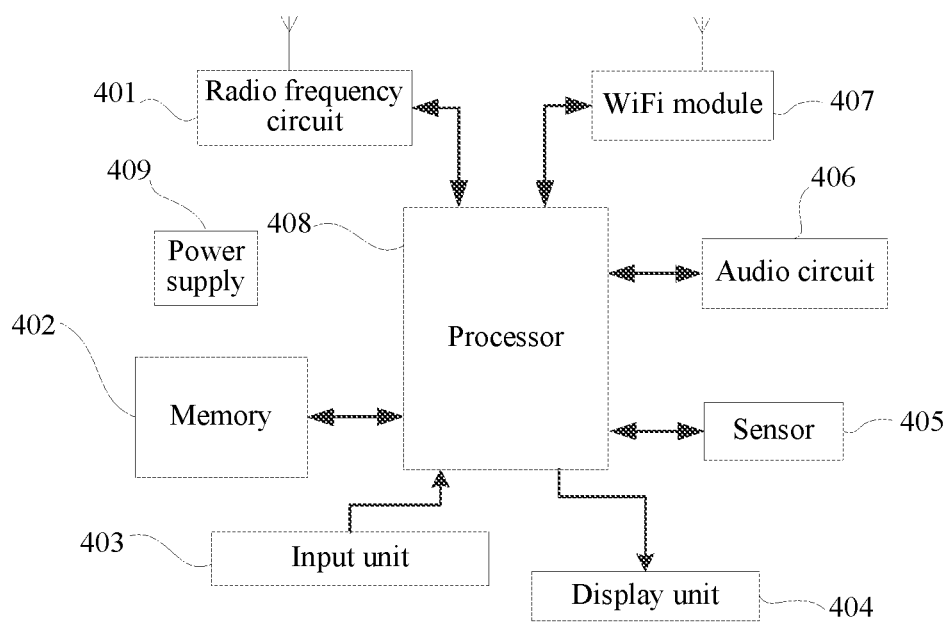
FIG. 5 is a schematic structural diagram of a mobile terminal according to an embodiment of the present disclosure.

Correspondingly, this embodiment of the present disclosure further provides a mobile terminal, which can be integrated with any one of the apparatuses for processing desktop data provided by the embodiments of the present disclosure. As shown in FIG. 5, the mobile terminal may include components such as a radio frequency (RF) circuit 401, a memory 402 including one or more computer readable storage mediums, an input unit 403, a display unit 404, a sensor 405, an audio circuit 406, a wireless fidelity (WiFi) 407, a processor 408 including one or more processing cores, and a power supply 409. A person skilled in the art may understand that, the structure of the mobile terminal shown in FIG. 5 does not constitute a limitation to the mobile terminal, and the mobile terminal may include more components or fewer components than those shown in the figure, or some components may be combined, or a different component deployment may be used.

The RF circuit 401 may be configured to receive and send signals during an information receiving and sending process or a call process. Particularly, the RF circuit 401 receives downlink information from a base station, then delivers the downlink information to one or more processors 408 for processing, and sends related uplink data to the base station. Generally, the RF circuit 401 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 401 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 402 may be configured to store a software program and module. The processor 408 runs the software program and module stored in the memory 402, thereby implementing various function applications and data processing. The memory 402 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 402 may include a high speed random access memory (RAM), and may also include a non-volatile memory, such as at least one magnetic disk storage device, a flash memory, or another volatile solid state storage device. Correspondingly, the memory 402 may further include a memory controller for the processor 408 and the input unit 403 to access the memory 402.

In the present disclosure, when executed by the processor 408, the software programs, modules, and units, such as the ones described in relation to FIGS. 3 and 4, implement the functions as described in relation to FIGS. 3 and 4.

In some embodiments, the acquisition unit 301, the establishment unit 302, determining unit 303, first processing unit 304, the second processing unit 305, and installation unit 306 are computer programs stored in the memory 402. When executed by the processor 408, the acquisition unit 301, the establishment unit 302, determining unit 303, first processing unit 304, the second processing unit 305, and installation unit 306 may implement the functions as described in relation to FIGS. 3 and 4.

The input unit 403 may be configured to receive input digit or character information, and generate a keyboard, mouse, joystick, optical, or track ball signal input related to the user setting and function control. Specifically, in a specific embodiment, the input unit 403 may include a touch-sensitive surface and another input device. The touch-sensitive surface, which may also be referred to as a touch display screen or a touch panel, may collect a touch operation of a user on or near the touch-sensitive surface (such as an operation of a user on the touch-sensitive surface or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 408. Moreover, the touch controller can receive and execute a command sent from the processor 408. In addition, the touch-sensitive surface may be may be a resistive, capacitive, infrared, or surface sound wave type touch-sensitive surface. In addition to the touch-sensitive surface, the input unit 403 may further include the another input device. Specifically, the another input device may include, but is not limited to, one or more of a physical keyboard, a functional key (such as a volume control key or a switch key), a track ball, a mouse, and a joystick.

The display unit 404 may be configured to display information input by the user or information provided for the user, and various graphical user interfaces of the mobile terminal. The graphical user interfaces may be formed by a graph, a text, an icon, a video, or any combination thereof. The display unit 404 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 408, so as to determine the type of the touch event. Then, the processor 408 provides corresponding visual output on the display panel according to the type of the touch event. Although, in FIG. 5, the touch-sensitive surface and the display panel are used as two separate parts to implement input and output functions, in some embodiments, the touch-sensitive surface and the display panel may be integrated to implement the input and output functions.

The mobile terminal may further include at least one sensor 405 such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile terminal, are not further described herein.

The audio circuit 406, a loudspeaker, and a microphone may provide audio interfaces between the user and the mobile terminal. The audio circuit 406 may convert received audio data into an electric signal and transmit the electric signal to the loudspeaker. The loudspeaker converts the electric signal into a sound signal for output. On the other hand, the microphone converts a collected sound signal into an electric signal. The audio circuit 406 receives the electric signal and converts the electric signal into audio data, and outputs the audio data to the processor 408 for processing. Then, the processor 408 sends the audio data to, for example, another mobile terminal by using the RF circuit 401, or outputs the audio data to the memory 402 for further processing. The audio circuit 406 may further include an earplug jack, so as to provide communication between a peripheral earphone and the mobile terminal.

WiFi is a short distance wireless transmission technology. The mobile terminal may help, by using the WiFi module 407, the user to receive and send e-mails, browse a webpage, access streaming media, and so on, which provides wireless broadband Internet access for the user. Although FIG. 5 shows the WiFi module 407, it may be understood that the WiFi module 407 is not a necessary component of the mobile terminal, and when required, the WiFi module 407 may be omitted as long as the scope of the essence of the present disclosure is not changed.

The processor 408 is the control center of the mobile terminal, and is connected to various parts of the mobile terminal by using various interfaces and lines. By running or executing the software program and/or module stored in the memory 402, and invoking data stored in the memory 402, the processor 408 performs various functions and data processing of the mobile terminal, thereby performing overall monitoring on the mobile terminal. Optionally, the processor 408 may include one or more processing cores. Preferably, the processor 408 may integrate an application processor and a modem. The application processor mainly processes an operating system, a user interface, an application program, and the like. The modem mainly processes wireless communication. It may be understood that, the foregoing modem may be not integrated into the processor 408.

The mobile terminal further includes the power supply 409 (such as a battery) for supplying power to the components. Preferably, the power supply may be logically connected to the processor 408 by using a power management system, thereby implementing functions such as charging, discharging, and power consumption management by using the power management system. The power supply 409 may further include one or more of a direct current or alternating current power supply, a re-charging system, a power failure detection circuit, a power supply converter or inverter, a power supply state indicator, and any other components.

Although not shown in the figure, the mobile terminal may further include a camera, a Bluetooth module, and the like, which are not described in detail herein again. Specifically, in this embodiment, the processor 408 in the mobile terminal loads, into the memory 402 according to the following instructions, executable files corresponding to processes of one or more application programs, and the processor 408 runs the application programs stored in the memory 402 to implement various functions.

Although not shown in the figure, the mobile terminal may further include a camera, a Bluetooth module, and the like, which are not described in detail herein again. Specifically, in this embodiment, the display unit of the mobile terminal is a touch screen display, and the mobile terminal may further include a memory and one or more programs. The one or more programs are stored in the memory and configured to be executed by one or more processors.

The one or more programs contain instructions used for implementing the following operations. Acquiring desktop data of a first mobile terminal, where the desktop data include a desktop layout file and installation packages of terminal applications, and the desktop layout file includes identifiers (that is, first identifiers) of folders, to which the terminal applications belong, in the first mobile terminal and location information of the terminal applications on a desktop of the first mobile terminal; creating local folders for these terminal applications according to the desktop layout file, and setting second identifiers; and establishing mapping relationships between the first identifiers and the second identifiers; then, traversing the installation packages of these terminal applications to determine whether these terminal applications are installed locally; if yes, determining, according to the mapping relationship, a local folder to which the terminal application belongs, acquiring installation information of the terminal application, placing the installation information in the determined local folder, acquiring an icon of the terminal application, and displaying the icon at a corresponding location on a local desktop according to the location information of the terminal application on the desktop of the first mobile terminal; and if not, acquiring the icon of the terminal application from the installation package of the terminal application, adding a Not Installed indication to the acquired icon, and displaying, at a corresponding location on the local desktop according to the location information of the terminal application on the desktop of the first mobile terminal, the icon added with the Not Installed indication.

Optionally, after the icon added with the Not Installed indication is displayed at the corresponding location on the local desktop, an installation instruction that is triggered by a user by clicking the icon added with the Not Installed indication may be further received; the installation package of the terminal application corresponding to the icon added with the Not Installed indication is acquired according to the installation instruction; and the acquired installation package of the terminal application is installed.

In addition, after the acquired installation package of the terminal application is installed, the Not Installed indication may be further removed from the icon added with the Not Installed indication, to inform the user that the terminal application is completely installed.

In addition, it should be noted that, in addition to acquisition of a terminal application indicated by the desktop layout file, other terminal applications (that is, remaining terminal applications) may further exist locally (that is, in the second terminal). In order to facilitate management, the remaining terminal applications may be placed in one folder, and then, the folder is placed at a preset location on the local desktop, where the location may be set according to a preference of the user or an actual application demand, for example, the folder may be placed after the last icon on the desktop, and the like.

It can be known from the foregoing descriptions that, in this embodiment, a mobile terminal acquires desktop data of a first mobile terminal, where the desktop data include a desktop layout file and installation packages of terminal applications, and the desktop layout file includes first identifiers and location information of the terminal applications on a desktop of the first mobile terminal; then, creates local folders for these terminal applications according to the desktop layout file, and sets second identifiers; and establishes mapping relationships between the first identifiers and the second identifiers; then, traverses the acquired installation packages of the terminal applications to determine whether these terminal applications are installed locally; if yes, determines, according to the mapping relationship, a local folder to which the terminal application belongs, places installation information of the terminal application in the determined local folder, acquires an icon of the terminal application, and displays the icon at a corresponding location on a local desktop according to the location information of the terminal application on the desktop of the first mobile terminal; and if not, acquires the icon of the terminal application from the acquired installation package of the terminal application, adds a Not Installed indication to the acquired icon, and then, displays, at a corresponding location on the local desktop according to the location information of the terminal application on the desktop of the first mobile terminal, the icon added with the Not Installed indication, so as to achieve the objective of migrating desktop data between different mobile terminals, and restore a desktop layout of a desktop data migrating party to the greatest extent, which can not only greatly reduce a desktop setting time, simplify an operation, and improve the efficiency, but also can migrate an installed terminal application in the desktop data migrating party to a mobile terminal to which the data is migrated, and reduce traffic and a time of re-downloading the terminal application.

A person of ordinary skill in the art may understand that all or some of the steps of the methods in the embodiments may be implemented by a program instructing relevant hardware. The program may be stored in a computer readable storage medium. The storage medium may include: a read-only memory (ROM), a RAM, a magnetic disk, or an optical disc.

The method, apparatus and system for processing desktop data of a mobile terminal provided by the embodiments of the present disclosure are described in detail above. The principle and implementation manners of the present disclosure are described herein by using specific examples. The description about the embodiments is merely provided for ease of understanding of the method and core ideas of the present disclosure. Meanwhile, a person of ordinary skill in the art may make variations and modifications to the present disclosure in terms of the specific implementation manners and application scopes according to the ideas of the present disclosure. Therefore, the content of the specification shall not be construed as a limit to the present disclosure.

What is claimed is:

1. A method for processing desktop data of a mobile terminal, comprising:

acquiring desktop data of a first mobile terminal, the desktop data comprising a desktop layout file and an installation package of a terminal application, the desktop layout file comprising a first identifier and location information of the terminal application on a desktop of the first mobile terminal, and the first identifier being an identifier of a folder, to which the terminal application belongs, in the first mobile terminal;

creating a local folder on the mobile terminal for the terminal application according to the desktop layout file of the first mobile terminal, and setting a second identifier on the mobile terminal, the second identifier being an identifier of the local folder;

establishing a mapping relationship between the first identifier and the second identifier;

traversing the installation package of the terminal application to determine whether the terminal application is installed locally in the mobile terminal;

if yes, determining, according to the mapping relationship, the local folder to which the terminal application belongs, the terminal application being installed locally in the mobile terminal before acquiring the desktop data of the first mobile terminal, acquiring installation information of the terminal application installed locally in the mobile terminal, placing the installation information in the determined local folder, acquiring an icon of the terminal application, and displaying the icon at a corresponding location on a local desktop of the mobile terminal according to the location information of the terminal application on the desktop of the first mobile terminal; and if not, acquiring the icon of the terminal application from the installation package of the terminal application, adding a Not Installed indication to the acquired icon, and displaying, at a corresponding location on the local desktop according to the location information of the terminal application on the desktop of the first mobile terminal, the icon added with the Not Installed indication.

2. The method according to claim 1, wherein the determining, according to the mapping relationship, the local folder to which the terminal application installed locally in the mobile terminal belongs comprises:

determining the first identifier of the terminal application in the first mobile terminal;

searching the mapping relationship according to the first identifier, to determine the second identifier in the mobile terminal; and determining that a local folder corresponding to the second identifier is the local folder to which the terminal application installed locally in the mobile terminal belongs.

3. The method according to claim 1, after the displaying, at a corresponding location on the local desktop of the mobile terminal according to the location information of the terminal application on the desktop of the first mobile terminal, the icon added with the Not Installed indication, further comprising:

receiving an installation instruction that is triggered by a user by clicking the icon added with the Not Installed indication;

acquiring, according to the installation instruction, the installation package of the terminal application corresponding to the icon added with the Not Installed indication; and installing the terminal application according to the acquired installation package of the terminal application.

4. The method according to claim 3, after the installing the terminal application according to the acquired installation package of the terminal application, further comprising:

removing the Not Installed indication from the icon added with the Not Installed indication.

5. The method according to claim 1, further comprising:

placing, in a newly created folder, an icon of a local terminal application except a terminal application indicated by the desktop layout file, and placing an icon of the newly created folder on the local desktop.

6. The method according to claim 1, after acquiring the desktop data of the first mobile terminal, further comprising:

establishing a table showing the mapping relationship of the terminal application, the first identifier and the second identifier.

7. The method according to claim 1, further comprising:

creating a first local folder and moving an icon of a remaining terminal application to the first local folder, wherein the remaining terminal application is installed in the mobile terminal locally before acquiring the desktop data of the first mobile terminal and is not installed in the first mobile terminal.

8. An apparatus for processing desktop data, including one or more processors executing one or more computer programs to process desktop data of a mobile terminal, processing desktop data comprising:

acquiring desktop data of a first mobile terminal, the desktop data comprising a desktop layout file and an installation package of a terminal application, the desktop layout file comprising a first identifier and location information of the terminal application on a desktop of the first mobile terminal, and the first identifier being an identifier of a folder, to which the terminal application belongs, in the first mobile terminal;

creating a local folder on the mobile terminal for the terminal application according to the desktop layout file of the first mobile terminal, and setting a second identifier on the mobile terminal, the second identifier being an identifier of the local folder; and establishing a mapping relationship between the first identifier and the second identifier;

traversing the installation package of the terminal application to determine whether the terminal application is installed locally in the mobile terminal;

when a determining unit determines that the terminal application is installed locally in the mobile terminal, determining, according to the mapping relationship, a local folder to which the terminal application belongs, the terminal application being installed locally in the mobile terminal before acquiring the desktop data of the first mobile terminal, acquiring installation information of the terminal application installed locally in the mobile terminal, placing the installation information in the determined local folder, acquiring an icon of the terminal application, and displaying the icon at a corresponding location on a local desktop of the mobile terminal according to the location information of the terminal application on the desktop of the first mobile terminal; and when the determining unit determines that the terminal application is not installed locally, acquiring the icon of the terminal application from the installation package of the terminal application, adding a Not Installed indication to the acquired icon, and displaying, at a corresponding location on the local desktop according to the location information of the terminal application on the desktop of the first mobile terminal, the icon added with the Not Installed indication.

9. The apparatus for processing desktop data according to claim 8, wherein the processing of desktop data further comprising:

when the determining unit determines that the terminal application is installed locally in the mobile terminal, determining the first identifier of the terminal application; searching the mapping relationship according to the first identifier, to determine the second identifier; determining that a local folder corresponding to the second identifier is the local folder to which the terminal application installed locally in the mobile terminal belongs; and acquiring the installation information of the terminal application installed locally in the mobile terminal, placing the installation information in the determined local folder, acquiring the icon of the terminal application, and displaying the icon at the corresponding location on the local desktop of the mobile terminal according to the location information of the terminal application on the desktop of the first mobile terminal.

10. The apparatus for processing desktop data according to claim 8, wherein the processing of desktop data further comprising:
receiving an installation instruction that is triggered by a user by clicking the icon added with the Not Installed indication; acquiring, according to the installation instruction, the installation package of the terminal application corresponding to the icon added with the Not Installed indication; and installing the terminal application according to the acquired installation package of the terminal application.

11. The apparatus for processing desktop data according to claim 10, wherein the processing of desktop data further comprising:
after an installation unit installs the terminal application according to the acquired installation package of the terminal application, removing the Not Installed indication from the icon added with the Not Installed indication.

12. The apparatus for processing desktop data according to claim 8, wherein the processing of desktop data further comprising:
placing, in a newly created folder, an icon of a local terminal application except a terminal application indicated by the desktop layout file, and placing an icon of the newly created folder on the local desktop.

13. An operating system of a mobile terminal, comprising the apparatus for processing desktop data according to claim 8.

14. A non-transient computer readable medium containing program instructions for causing a computer to perform a method for processing desktop data of a mobile terminal, the method comprising:
acquiring desktop data of a first mobile terminal, the desktop data comprising a desktop layout file and an installation package of a terminal application, the desktop layout file comprising a first identifier and location information of the terminal application on a desktop of the first mobile terminal, and the first identifier being an identifier of a folder, to which the terminal application belongs, in the first mobile terminal;
creating a local folder on the mobile terminal for the terminal application according to the desktop layout file of the first mobile terminal, and setting a second identifier on the mobile terminal, the second identifier being an identifier of the local folder;
establishing a mapping relationship between the first identifier and the second identifier;
traversing the installation package of the terminal application to determine whether the terminal application is installed locally in the mobile terminal;
if yes, determining, according to the mapping relationship, the local folder to which the terminal application belongs, the terminal application being installed locally in the mobile terminal before acquiring the desktop data of the first mobile terminal, acquiring installation information of the terminal application installed locally in the mobile terminal, placing the installation information in the determined local folder, acquiring an icon of the terminal application, and displaying the icon at a corresponding location on a local desktop of the mobile terminal according to the location information of the terminal application on the desktop of the first mobile terminal; and
if not, acquiring the icon of the terminal application from the installation package of the terminal application, adding a Not Installed indication to the acquired icon, and displaying, at a corresponding location on the local desktop according to the location information of the terminal application on the desktop of the first mobile terminal, the icon added with the Not Installed indication.

15. The non-transient computer readable medium according to claim 14, wherein the determining, according to the mapping relationship, the local folder to which the terminal application installed locally in the mobile terminal belongs comprises:
determining the first identifier of the terminal application in the first mobile terminal;
searching the mapping relationship according to the first identifier, to determine the second identifier in the mobile terminal; and
determining that a local folder corresponding to the second identifier is the local folder to which the terminal application installed locally in the mobile terminal belongs.

16. The non-transient computer readable medium according to claim 14, after the displaying, at a corresponding location on the local desktop of the mobile terminal according to the location information of the terminal application on the desktop of the first mobile terminal, the icon added with the Not Installed indication, further comprising:
receiving an installation instruction that is triggered by a user by clicking the icon added with the Not Installed indication;
acquiring, according to the installation instruction, the installation package of the terminal application corresponding to the icon added with the Not Installed indication; and
installing the terminal application according to the acquired installation package of the terminal application.

17. The non-transient computer readable medium according to claim 16, after the installing the terminal application according to the acquired installation package of the terminal application, the method for processing desktop data of a mobile terminal further comprising:
removing the Not Installed indication from the icon added with the Not Installed indication.

18. The non-transient computer readable medium according to claim 14, the method for processing desktop data of a mobile terminal further comprising:
placing, in a newly created folder, an icon of a local terminal application except a terminal application indicated by the desktop layout file, and placing an icon of the newly created folder on the local desktop.

* * * * *